(12) United States Patent
Heanue et al.

(10) Patent No.: US 10,890,719 B2
(45) Date of Patent: Jan. 12, 2021

(54) OPTICAL INTERCONNECT FOR SWITCH APPLICATIONS

(71) Applicant: T&S Communications Co. Ltd., Shenzhen (CN)

(72) Inventors: John Heanue, Boston, MA (US); Bardia Pezeshki, Menlo Park, CA (US); Charles Amsden, Fremont, CA (US); Lucas Soldano, Milan (IT)

(73) Assignee: T&S Communications Co., Ltd., Shenzhen (CN)

( * ) Notice: Subject to any disclaimer, the term of this patent is extended or adjusted under 35 U.S.C. 154(b) by 0 days.

(21) Appl. No.: 16/696,241

(22) Filed: Nov. 26, 2019

(65) Prior Publication Data

US 2020/0355871 A1 Nov. 12, 2020

Related U.S. Application Data

(63) Continuation of application No. 15/961,765, filed on Apr. 24, 2018, now abandoned, which is a (Continued)

(51) Int. Cl.
*G02B 6/30* (2006.01)
*G02B 6/12* (2006.01)
*G02B 6/32* (2006.01)
*G02B 6/42* (2006.01)
*G02B 6/124* (2006.01)
*H04Q 11/00* (2006.01)
*G02B 6/34* (2006.01)

(52) U.S. Cl.
CPC .......... *G02B 6/30* (2013.01); *G02B 6/12004* (2013.01); *G02B 6/124* (2013.01); *G02B 6/12011* (2013.01); *G02B 6/12019* (2013.01); *G02B 6/32* (2013.01); *G02B 6/4204* (2013.01); *G02B 6/4249* (2013.01); *G02B 6/4292* (2013.01); *G02B 6/34* (2013.01); *G02B 6/4214* (2013.01); *G02B 2006/12102* (2013.01); *G02B 2006/12121* (2013.01); *G02B 2006/12145* (2013.01); *H04Q 2011/0022* (2013.01)

(58) Field of Classification Search
None
See application file for complete search history.

(56) References Cited

U.S. PATENT DOCUMENTS

2015/0125110 A1 5/2015 Anderson et al.
2016/0170163 A1 6/2016 Butler et al.
(Continued)

OTHER PUBLICATIONS

U.S. Appl. No. 15/961,765, filed Apr. 24, 2018, John Heanue, Bardia Pezeshki, Charles Amsden, Lucas Soldano, US 2019-0072720 A1, Office Action dated Jan. 8, 2019, Notice of Allowance dated Aug. 26, 2019.

*Primary Examiner* — Michelle R Connelly
(74) *Attorney, Agent, or Firm* — Klein, O'Neill & Singh, LLP

(57) ABSTRACT

A switch module includes a switch integrated circuit (IC), a silicon photonics chips, and an interface having removably coupled first side and second side. The first side includes a lens array optically coupled to a SiP chip and the second side includes a connector having a plurality of planar lightwave circuits (PLCs) optically coupled to another lens array.

4 Claims, 8 Drawing Sheets

Related U.S. Application Data continuation of application No. 15/299,310, filed on Oct. 20, 2016, now abandoned.

(60) Provisional application No. 62/244,083, filed on Oct. 20, 2015.

(56) References Cited

U.S. PATENT DOCUMENTS

| | | |
|---|---|---|
| 2016/0209595 A1 | 7/2016 | Taira |
| 2016/0246009 A1 | 8/2016 | Jiang |
| 2016/0337727 A1* | 11/2016 | Graves .................. G02B 6/354 |
| 2016/0370544 A1 | 12/2016 | Badihi et al. |
| 2017/0115456 A1 | 4/2017 | Sugama |
| 2017/0153391 A1 | 6/2017 | Verslegers et al. |
| 2017/0163369 A1 | 6/2017 | Welch |
| 2017/0186739 A1 | 6/2017 | Budd et al. |
| 2017/0261704 A1 | 9/2017 | Doany et al. |
| 2017/0272845 A1 | 9/2017 | Pezeshki et al. |

* cited by examiner

OPTICAL INTERCONNECT FOR SWITCH APPLICATIONS

CROSS-REFERENCE TO RELATED APPLICATIONS

This application is a continuation of U.S. patent application Ser. No. 15/961,765, filed Apr. 24, 2018, which is a continuation of U.S. patent application Ser. No. 15/299,310, filed Oct. 20, 2016, which claims the benefit of the filing date of U.S. Provisional Patent Application No. 62/244,083, filed on Oct. 20, 2015, the disclosures of which are incorporated by reference herein.

BACKGROUND OF THE INVENTION

The present application relates generally to fiber optic communications, and more particularly to optical connections for silicon photonics chips.

Fiber optic communications lines are often used to pass data between electronic units. The fiber optic communications lines may be used both for long haul telecommunications applications and for shorter applications, such as for communications between servers in a data center. In either case, electro-optic conversion is provided between the electrical data of the electronic units and light passed by the fiber optic communication lines.

Generally the equipment used to perform electro-optic conversion is in the form of a transceiver that is plugged in to a faceplate of the electronic units, and there may be many such transceivers for any specific electronic unit, for example a server or a switch. For example, typical switches used in datacenters can have tens or even hundreds of optical transceivers that populate the front plate of the unit. Unfortunately, it may be difficult to cool the transceivers in the front panel. In addition, the data signals passed between the transceivers and the electronic switch circuitry are often high frequency signals that may suffer degradation during travel between the electronic switch circuitry, generally on circuit boards within the unit, and the transceivers, generally at a face plate of the unit.

Silicon Photonics (SiP) integrated circuit (IC) chips may be used to perform electro-optic conversion, and the SiP IC chips may be placed on boards with or near other electronic integrated circuits of an electronic unit such as a switch. However, light signals carried by the fiber optic communications would still need to be brought within the electronic equipment, for example the switch, and provided to the SiP IC chips. There may be difficulties in doing so, as for example as the SiP chip may be subject to various handling and processing operations, for example post-chip manufacturing operations.

BRIEF SUMMARY OF THE INVENTION

One aspect of the invention provides an optical connector for a silicon photonics chip, comprising: a housing; a plurality of lenses at least partially within the housing; a plurality of planar lightwave circuits (PLCs), positioned at least partially within the housing, to pass light to or receive light from the lenses; a plurality of optical fibers coupled to the PLCs.

Another aspect of the invention provides an optical system, comprising: a silicon photonics (SiP) integrated circuit (IC) chip including a plurality of grating couplers for use in passing light through a boundary of the SiP IC chip, a plurality of modulators for modulating light received by at least first set of the plurality of grating couplers and provided to a second set of the plurality of grating couplers, and a plurality of photodiodes for generating electrical signals based on light received by at least a third set of the plurality of grating couplers; a first array of lenses positioned on top of the SiP chip to pass light from the plurality of grating couplers; an optical cable connector coupled to the SiP IC, the optical cable connector including a second array of lenses positioned to pass light from the first array of lenses, and a plurality of planar lightwave circuits (PLCs) positioned to receive light from the second array of lenses.

Another aspect of the invention provides a switch module comprising: a switch integrated circuit (IC) chip including a switch for routing inputs to outputs of the switch IC chip; a silicon photonics (SiP) chip including photodetectors for use in converting first optical signals to first electrical signals and modulators for modulating second optical signals in accordance with second electrical signals, outputs of the photodetectors being coupled to inputs of the switch IC chip and outputs of the switch IC chip being coupled to the modulators; and an interface including a first side and a second side, the first side including a first lens array optically coupled to the SiP chip, the second side including a connector having a plurality of planar lightwave circuits (PLCs) optically coupled to a second lens array, the second lens array and the first lens array positioned to pass light to each other.

These and other aspects of the invention are more fully comprehended upon review of this disclosure.

BRIEF DESCRIPTION OF THE FIGURES

Aspects of the disclosure are illustrated by way of examples.

DETAILED DESCRIPTION

Figure 1:
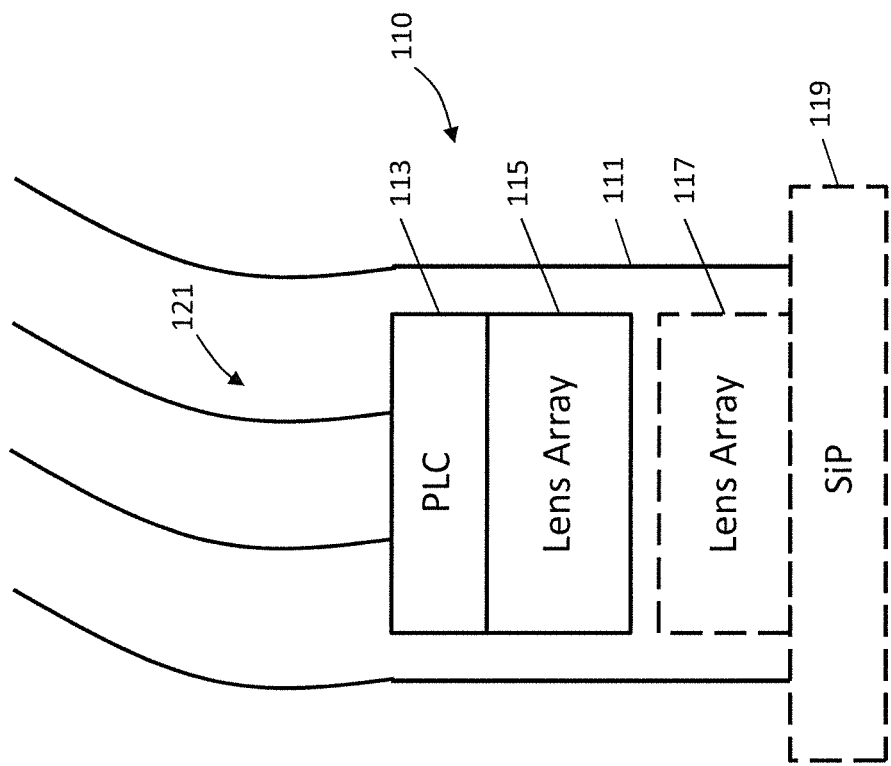
FIG. 1 is a semi-block diagram of an interface for optical interconnect applications that includes a removable optical connector, including planar lightwave circuits (PLC), for a silicon photonics (SiP) chip in accordance with aspects of the invention.

FIG. 1 is a semi-block diagram of an interface for optical interconnect applications that includes a removable optical connection for a silicon photonics (SiP) integrated circuit (IC) chip, in accordance with aspects of the invention. As illustrated in FIG. 1, a first lens array 117 is mounted to a SiP IC chip 119. As shown in FIG. 1 the first lens array is shown in oversized form with respect to the SiP IC chip, as are other components. The first lens array 117 in some embodiments is mounted directly on top of the SiP IC chip 119, as shown in FIG. 1. Lenses of the first lens array are positioned to direct light into or receive light from grating couplers of the SiP IC chip. In various embodiments the lenses of the first lens array are arranged in linear arrays, for example forming rows, with the linear arrays providing a matrix of lenses.

The connection includes a removable connector 110. The connector includes a housing 110 which is mounted to the SiP IC chip and/or the first lens array 117, such that an end cavity of the housing is positioned to generally receive light from and/or pass light to the first lens array 117. In some embodiments the end cavity of the housing is sized with respect to a carrier for the first lens array 117 such that the housing securely mates by way of a compression fit to the carrier of the first lens array 117. In some embodiments the housing includes a mating connector for connecting to the carrier of the first lens array. In some embodiments the connector is on MXC connector.

A second lens array 115 is within the housing near the end of the cavity. The second lens array is positioned within the cavity so as to be generally optically aligned with the first lens array with the housing mounted to the first lens array and/or SiP IC chip. The first lens array and the second lens array therefore provide a beam connector. In various embodiments the lenses of the lens arrays are lenses that expand beams that propagate towards the lenses of the other lens array, with the lens arrays therefore forming an expanded-beam connector.

The housing includes at least one planar lightwave circuitry (PLC), and in most embodiments a plurality of PLCs. The PLCs are within the housing on a side of the second lens array away from the first lens array. In some embodiments the PLCs include a demultiplexer (DMUX) for providing wave division multiplexed optical input signals to the second lens array, a multiplexer (MUX) for carrying optical output signals from the second lens array, and either pass through paths or a DMUX for carrying optical signals, to be modulated by the SiP IC chip, from laser diodes. In some embodiments the laser diodes are included in the housing of the connector, along with, in some embodiments, a MEMS structure to couple light of the lasers into waveguides of one of the PLCs. The PLC 113 in some embodiments is mounted directly on top of the lens array 115. In some embodiments fiber assemblies to carry optical signals to and from the PLCs are bonded to an opposing side of the PLCs, away from the second lens array.

The connector, for example, serves to form a removable optical connection between the PLC and the SiP chip by removably coupling both ends of the interface together for passing of light between the PLC and the SiP chip. In operation, the interface receives light from fibers. The light may be demultiplexed by the PLC, for example by a demultiplexing arrayed waveguide grating (AWG) into separate waveguides. Light from these waveguides may be deflected into the lens array 115, with the lens array 115 focusing the light into the lens array 117. The lens array 117 may focus the light into the SiP chip 119 for converting optical signals to electrical signals. For example, the SiP chip may include grating couplers that send light into waveguides into the SiP chip where light from the waveguides is received by photodetectors, which provide electrical signals. The electrical signals are amplified by a TIA, and in some embodiments equalized and clocked by a CDR and exit the SiP chip assembly.

In some embodiments, the interface serves to output or transmit light, for example, to transmit fibers. For example, continuous wave (CW) lasers are coupled to waveguides in the PLC, within some embodiments the lasers being in the housing of the connector. Light from these waveguides are directed into the SiP chip by the lens arrays and enter waveguides in the SiP chip through the grating couplers of the SiP chip. The light in the waveguides are then modulated by modulators and exit the SiP chip through the grating couplers. The SiP chip then passes the light to the lens array 117 which in turn, focuses the light into the lens array 115. The lens array 115 may provide the light to waveguides in the PLC. The PLC may include a transmit arrayed waveguide grating (AWG) for multiplexing light in the waveguides into a single output, which is provided to the transmit fibers.

Figure 2:
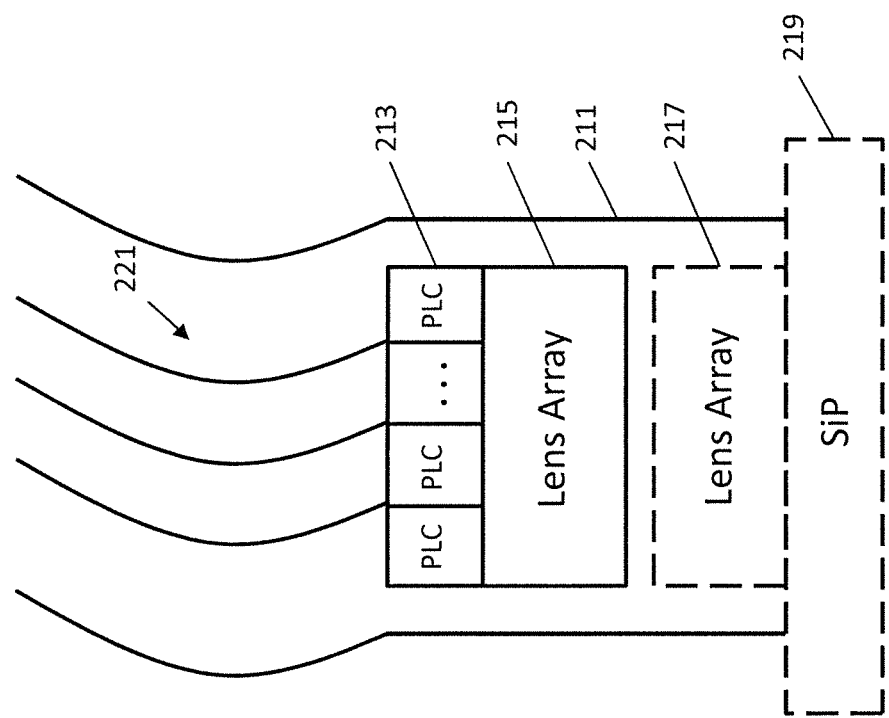
FIG. 2 is a semi-block diagram of a further view of the interface for optical interconnect applications that includes a removable optical connector, including planar lightwave circuits (PLCs), for a silicon photonics (SiP) chip in accordance with aspects of the invention.

FIG. 2 is a semi-block diagram of an interface for optical interconnect applications that includes a removable optical connection between planar lightwave circuits (PLCs) and a silicon photonics (SiP) chip in accordance with aspects of the invention. In some embodiments the embodiment of FIG. 2 may be considered a side view of the embodiment of FIG. 1. As shown in FIG. 2, a first side of the interface includes a first lens array 217 coupled to a SiP chip 219. A second side of the interface includes a connector 211 having a plurality of PLCs 213 coupled to a second lens array 215. The connector 211 may be the same as the connector 111 in various embodiments. The first lens array 217 in some embodiments is mounted directly atop the SiP chip 219. The plurality of PLCs 213 in some embodiments are mounted directly atop the second lens array 215. Fiber assemblies 221 extend from the PLCs. In some embodiments, each of the plurality of the PLCs is stacked next to (or on top of) one another. In some embodiments, each of the first and second lens array includes four rows of lens elements, with each row including sixteen lens elements for up to sixty-four total optical connections.

The connector 211 may form a removable optical connection between the plurality of PLCs and the SiP chip 219 by removably coupling or connecting the first and second sides of the interface together for passing of optical signals between the plurality of PLCs and the SiP chip 219. In operation, the interface receives optical signals which are provided to one of the plurality of PLCs for demultiplexing the signals, for example by a demultiplexing AWG, into various waveguides. Light from the waveguides may be deflected into the seconds lens array which in turn, focuses the light to the first lens array. The first lens array then may focus the light into the SiP chip 219 for converting optical signals to electrical signals. For example, the SiP chip may include grating couplers that send light into waveguides into the SiP chip where lights from the waveguides are received by germanium photodetectors, which provide electrical signals. The electrical signals are amplified by a TIA, and in some embodiments equalized and clocked by a CDR and exit the SiP chip.

In some embodiments, the interface outputs optical signals, for example, to transmit optical fibers. For example, continuous wave (CW) lasers are coupled to waveguides in another of the plurality of PLCs. Light from these waveguides are passed by the lenses of the lens arrays into the SiP chip and enter waveguides in the SiP chip through the grating couplers of the SiP chip. The light in the waveguides are then modulated by modulators and exit the SiP chip through other grating couplers. The light then is routed to other lenses of the first lens array and in turn, the first lens array focuses the light into other lenses of the second lens array. The second lens array then routes the light to waveguides in the other PLC. The other PLC may include a transmit AWG for multiplexing or combining light in the waveguides into a single output provided to the transmit fibers.

Figure 3:
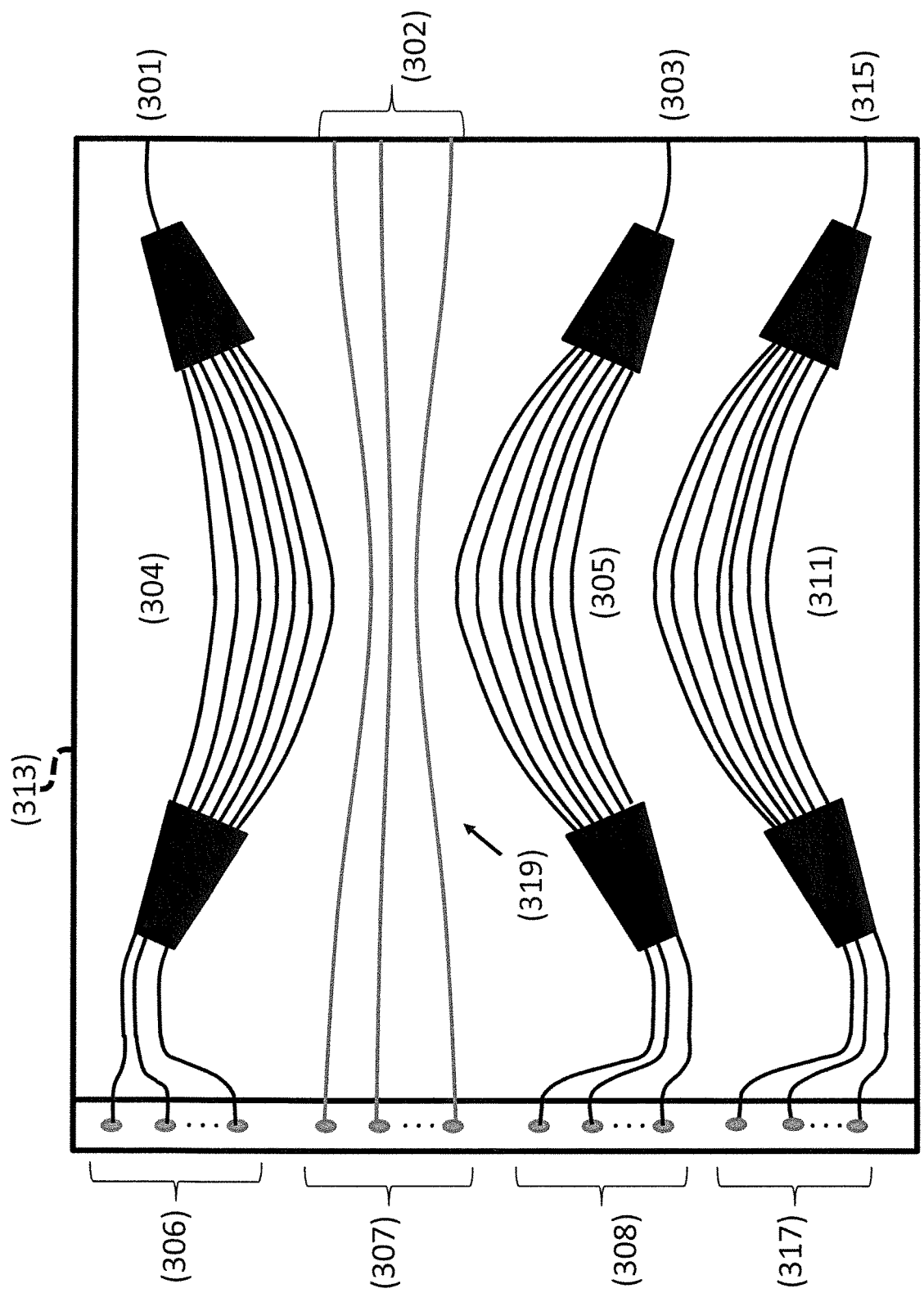
FIG. 3 shows an example of a PLC in accordance with aspects of the invention.

FIG. 3 shows an example of a PLC 313 in accordance with aspects of the invention. On the right hand side of the figure, where the PLC interfaces to fibers and lasers, there are four features. At the very top of the figure is an input waveguide (301) coupled to a demultiplexer structure. This input waveguide would be aligned and affixed to a capillary and fiber assembly. Immediately below the input waveguide are a plurality of input waveguides (302) that connect to a laser assembly (not shown). In some embodiments, the plurality of input waveguides is sixteen input waveguides. Immediately below the plurality of input waveguides is an output waveguide (303) that connects to an output capillary and fiber. At the bottom is a spare waveguide (315), which in some embodiments may be an input or output waveguide connecting to a capillary and fiber assembly. In some embodiments, however, each of the waveguides are provided on a separate PLC.

In addition, there are four structures on the PLC of FIG. 3. These four structures, however, may be provided on separate PLCs, for example when the waveguides previously mentioned are on separate PLCs. Three of the four structures include a demultiplexing arrayed waveguide grating (AWG) (304), waveguide connections (319), and a multiplexing AWG (305). A fourth structure (311) in some embodiments may be a demultiplexing AWG or multiplexing AWG.

The left hand side of the PLC of FIG. 3 includes demultiplexed waveguides (306) that connect to a receiver, waveguides (308) that come from modulators and are subsequently multiplexed on the PLC, waveguides (307) that send continuous wave (CW) signals from the laser assembly into input of the modulators, and spare waveguides (317) that may be utilized as demultiplexed waveguides or waveguides from modulators. In some embodiments, the PLC includes sixteen demultiplexed waveguides (306), sixteen waveguides (307), sixteen waveguides (308), and sixteen spare waveguides (317). In some embodiments, such as those in which the waveguides 301, 302, 303, and 315, correspondingly with the structures 304, 319, 305, and 311, respectively, are on different PLCs, the waveguides 700, 307, 308, and 317 are on the corresponding different PLCs as well.

Accordingly, in some embodiments, features of the PLC 313 may be implemented in a plurality of PLCs. For example, a first PLC may include the input waveguide (301), the demultiplexing AWG (304), and the demultiplexed waveguides (306). A second PLC may include the plurality of input waveguides (302), the waveguide connections (319), and the waveguides (307) for sending CW signals from the laser assembly. A third PLC may include the output waveguide (303), the multiplexing AWG (305), and the waveguides (308) that come from modulators and are multiplexed on the third PLC. And a fourth PLC may include the spare waveguide (315), the fourth structure (311), and the spare waveguides (317). In some embodiments, each of the plurality of PLCs is stacked on top of one another.

Figure 4:
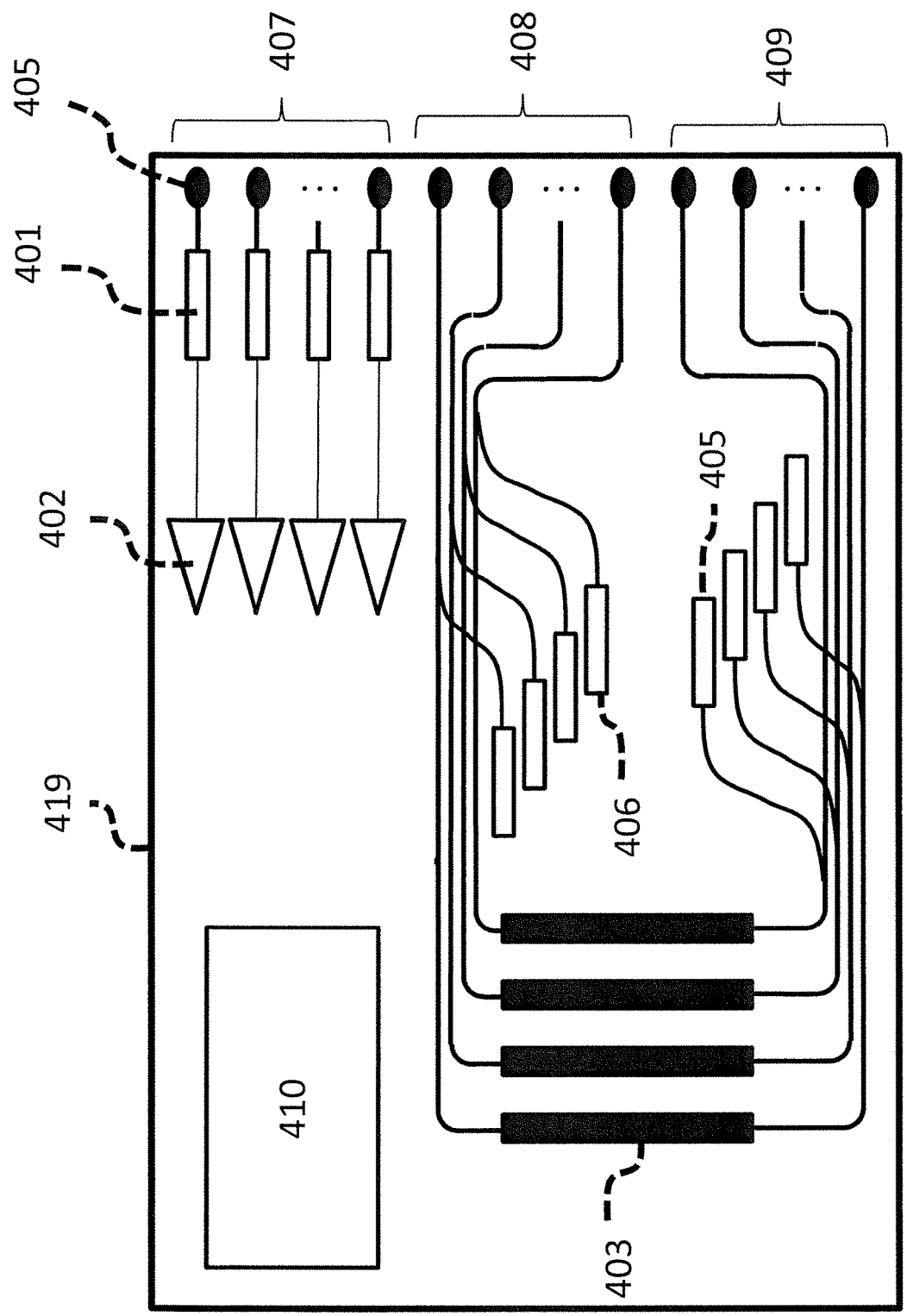
FIG. 4 shows a schematic of a silicon photonics (SiP) chip in accordance with aspects of the invention.

FIG. 4 shows a schematic of a silicon photonics (SiP) chip in accordance with aspects of the invention. As shown in FIG. 4, a SiP chip 419 includes, on the right hand side of the figure, optical inputs and outputs that are received from a connector, for example the connector of FIG. 1 or 2, and onto grating couplers 405. The SiP chip further includes receiver inputs 407, inputs 408 from lasers which go to modulators 403, and modulated outputs 409 of a transmitter. The inputs and outputs are shown on the right hand side of the Figure for convenience, in most embodiments the inputs and outputs are arranged, for example in linear rows, on a top surface of the SiP chip so as to provide light to or receive light from a lens array, such as the first lens array of FIG. 1.

The input chain of the receiver goes to high speed photodetectors 401 that are integrated with the SiP chip and in turn goes to transimpedence amplifiers 402. The CW laser inputs go to the modulators 403 and then exit the SiP chip. Optionally, one may have low speed photodetectors on the chip that tap a small amount of the transmit or receive chain. Those tapping the receive chain 406 can monitor the input power and adjust the laser bias to compensate for temperature variations of laser output power or for aging. The output of these detectors are particularly useful in the MEMS alignment process, because position of microlenses preferably make use of some sort of a signal to optimize position. The taps on the output 405, for example, could be used to monitor the health of the modulators and set off an alarm should the power vary outside the specifications. The SiP chip could of course also contain electronics 410 for control of signals or to process signals. The control and driver function can also be implemented in a separate chip that would be bonded to the main SiP chip.

In some embodiments, the number of channels may be sixteen. In some embodiments, thirty six channels modulated at 25 Gbaud using PAM4 modulation would result in a total bandwidth of 1.8 Tb/s and only a single input fiber would be needed at the input and another at the output. The wavelength spacing could be placed close together and the entire system temperature controlled for additional channels.

Figure 5:
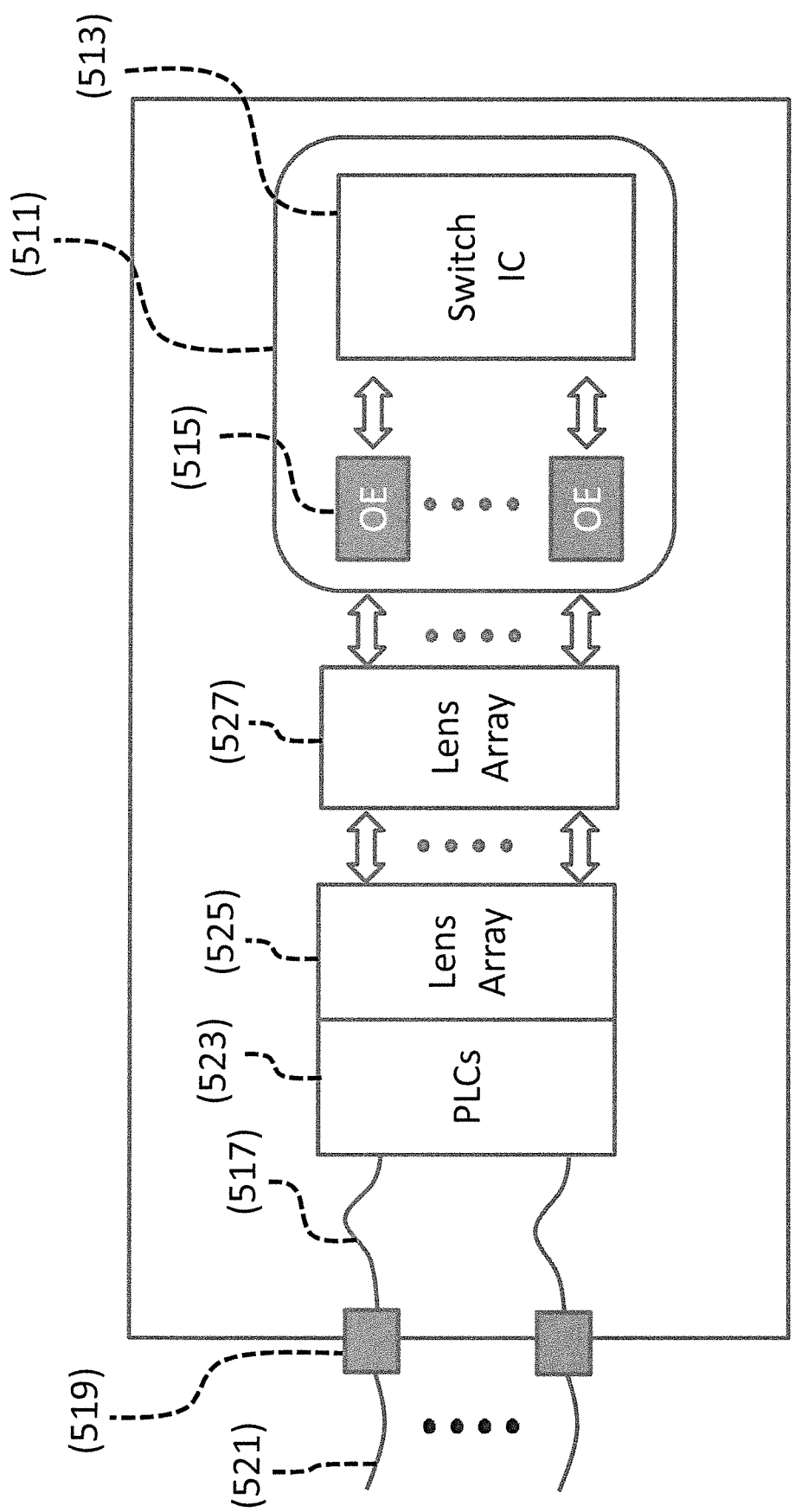
FIG. 5 illustrates a switch having a switch package comprising a switch IC and optical modules in accordance with aspects of the invention.

FIG. 5 illustrates a switch having a switch package comprising a switch IC and optical modules in accordance with aspects of the invention. As illustrated in FIG. 5, a switch module 500 includes a central package 511 including a switch IC 513 and optical/electrical (OE) conversion modules 515 that convert electrical input/output (I/O) of the switch chip to optical signals. In some embodiments, the OE conversion modules are included within a SiP chip (not shown).

The switch IC includes a switch (not shown), which routes data between switch inputs and switch outputs. The routing of the data is generally controlled by a switch IC processor (not shown), which for example may utilize information of the data, for example in packet headers, as well as routing table maintained by the processor in determining routing of the data between switch inputs and switch outputs.

In some embodiments, on a transmit path, the OE conversion modules transmits optical signals to a first lens array 527, which focuses the optical signals into a second lens array 525. The first lens array may be mounted to the SiP chip, for example as discussed with respect to FIGS. 1 and 2. The second lens array 525, which is coupled to a plurality of PLCs 523, then routes the optical signals to one of the plurality of PLCs for outputting a combined or multiplexed optical signal to one of patch panels 519 by way of one of inside fiber links 517, with the inside fiber links coupled to the plurality of PLCs. The second lens array and the PLCs, for example, may be within a cable connector, as discussed for example with respect to FIGS. 1 and 2.

In some embodiments, on a receive path, another of the patch panels 519 receives optical signals, by way of one of outside fiber links 521, and route the optical signals to another of the plurality of PLCs. The other PLC passes demultiplexed optical signals to the second lens array, with the second lens array focusing the demultiplexed optical signals to the first lens array. The first lens array then focuses the demultiplexed optical signals to the OE conversion modules for conversion of the optical signals to electrical input signals to the switch IC.

In some embodiments, the central package may be cooled by a common central heatsink (not shown). At the front panel of the switch module there is no need for transceivers as the patch panels 519 connect the inside fiber links to the outside fiber links. The electrical link between the switch IC and the OE modules are very short and therefore may not require reshaping, or in some embodiments retiming. Eliminating these equalization circuits may save considerable amount of power and complexity. In addition, front panel density may be increased since the patch panels can be connected tightly and one can get much denser I/O than when using optical transceiver subassemblies. There is no heat generated in the front panel where cooling is more difficult. The OE modules that generate heat, do so at the center of the board where there is room for a large heatsink and good airflow. Since no extra packaging is required for the electronics of the transceivers, and there are no CDRs, the OE modules are cheaper than transceivers and thus the overall cost of a populated switch is much cheaper with this configuration.

Figure 6:
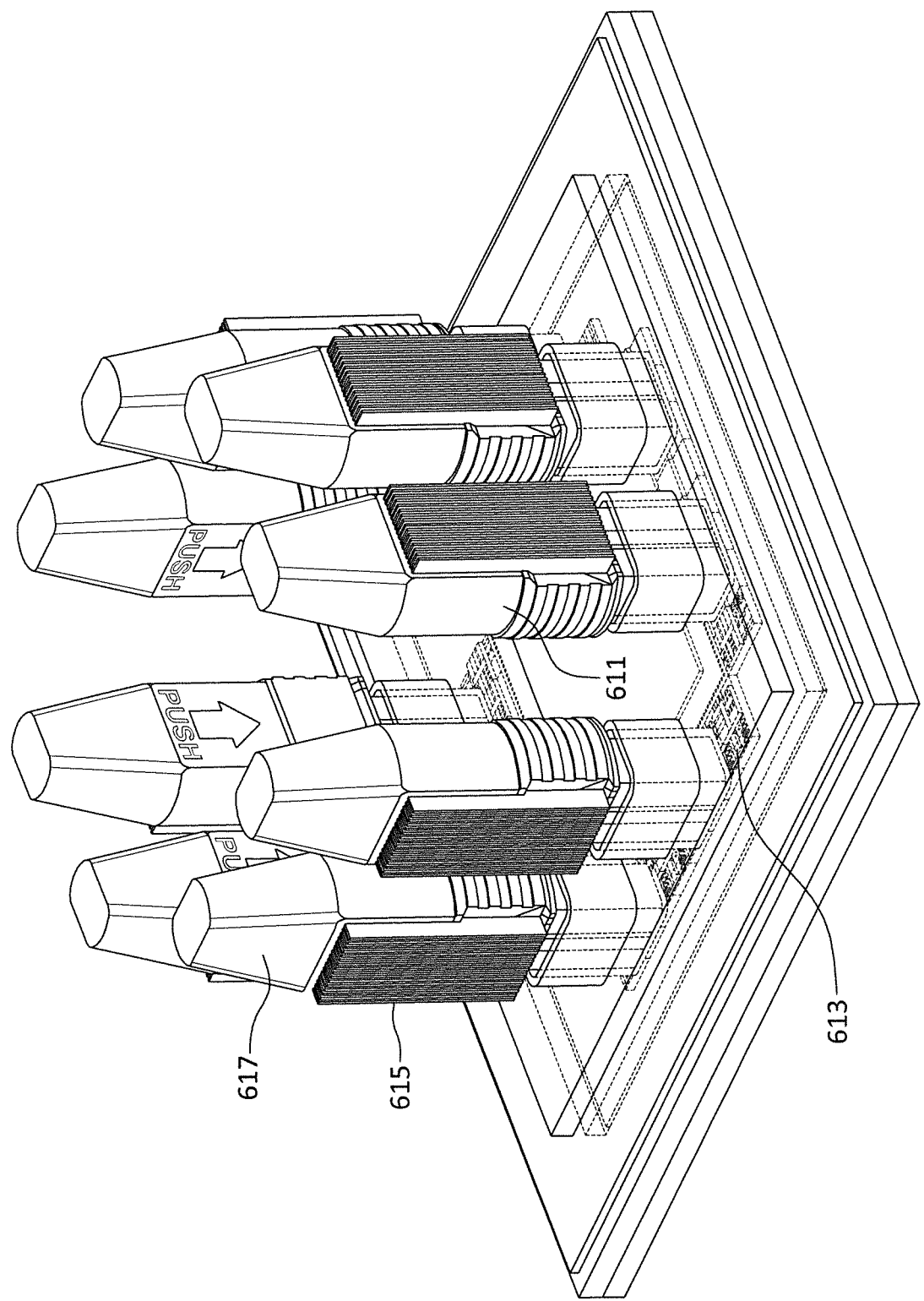
FIG. 6 illustrates a switch architecture with optical connection directly on silicon photonic (SiP) ICs.

FIG. 6 is a switch architecture with optical connectors directly on silicon photonic (SiP) ICs. As shown in FIG. 6, eight MXC-type optical connectors 611 are packaged together in the switch architecture, with a pair of the optical connectors connected to SiP ICs 613 mounted on each side of a 4-sided breadboard or platform. Each of the optical connectors in some embodiments may be the connector of FIG. 1 or the connector of FIG. 2. The optical connectors serve to form removable optical connection between PLCs (not shown) and the SiP ICs. Each of the optical connectors may include a heatsink 615 to assist in dissipating heat, for example generated by lasers, if in the optical connectors, and the optical connectors may also incorporate a PCB with control electronics for the lasers. In some embodiments, each of the optical connectors is an expanded-beam connector, having lens elements incorporated within the connector. In some embodiments, four rows of sixteen lens elements per row are incorporated in each of the optical connectors for a total of up to 64 connections. As such, the switch architecture shown in FIG. 6 may include up to 512 connections.

As further shown in FIG. 6, each of the optical connector includes an end connected to one of the SiP ICs 613 and another end being covered by a cap 617. The cap may be removed to connect the other end of the optical connector to, for example, optical fibers connected to a front panel of a switch module.

Figure 7:
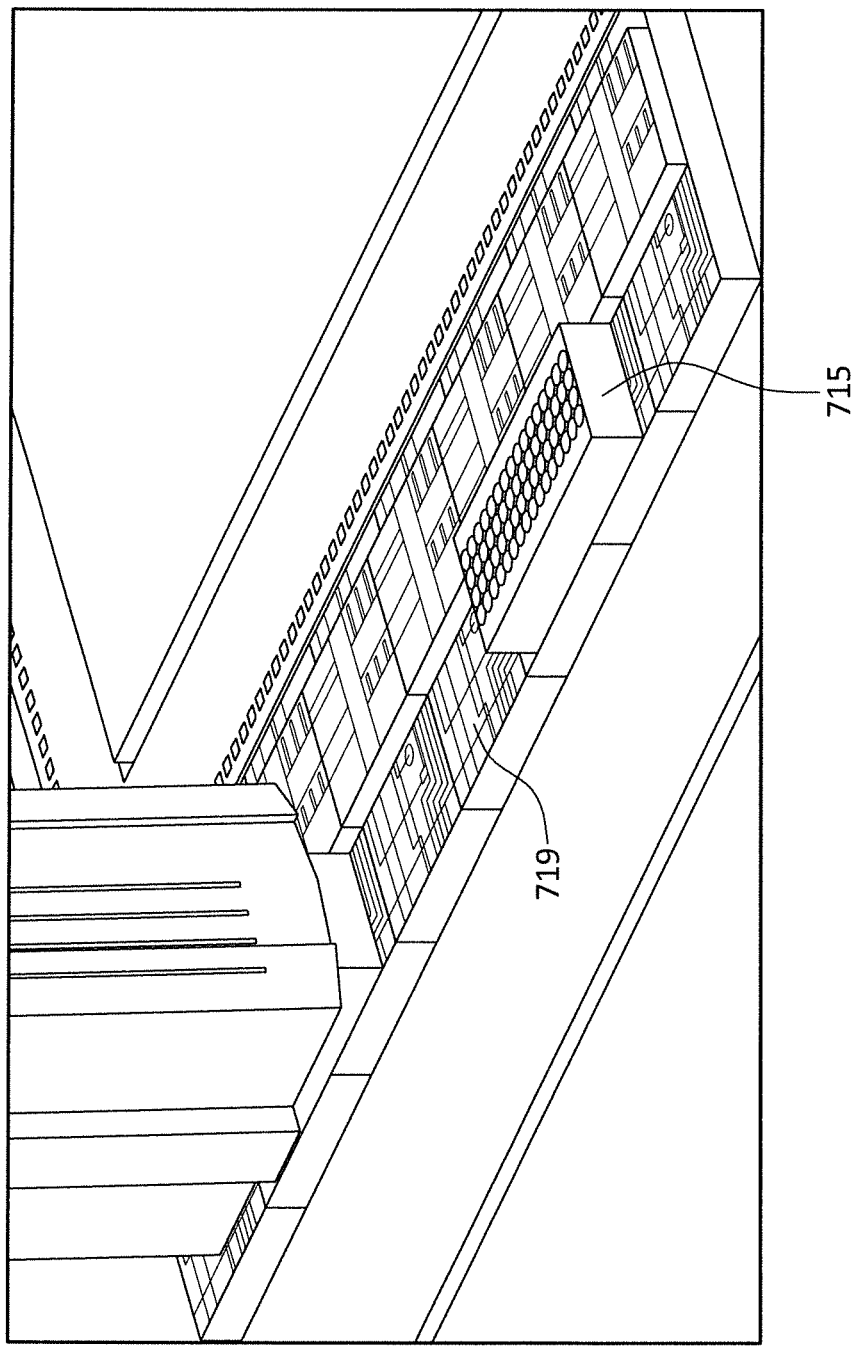
FIG. 7 illustrates a view of an IC side of an interface for optical interconnection in accordance with aspects of the invention.

FIG. 7 shows a detailed view of an IC side of an interface for optical interconnection in accordance with aspects of the invention. In FIG. 7, the IC side includes a lens array 715 that is mounted directly on top of the SiP IC 719, with the SiP IC mounted on a breadboard or platform. The lens array may be, for example, the first lens array of FIGS. 1 and/or 2. The lens array includes four rows of lens with sixteen lens per row for up to 64 total connections. Each lens serves to focus light into a grating coupler on the SiP IC surface. In some embodiments, one row may be used for 16 Rx signals, one row may be used for 16 Tx signals, one row may be used to bring light from lasers to the SiP IC, and one row may be used as a spare row.

Figure 8A:
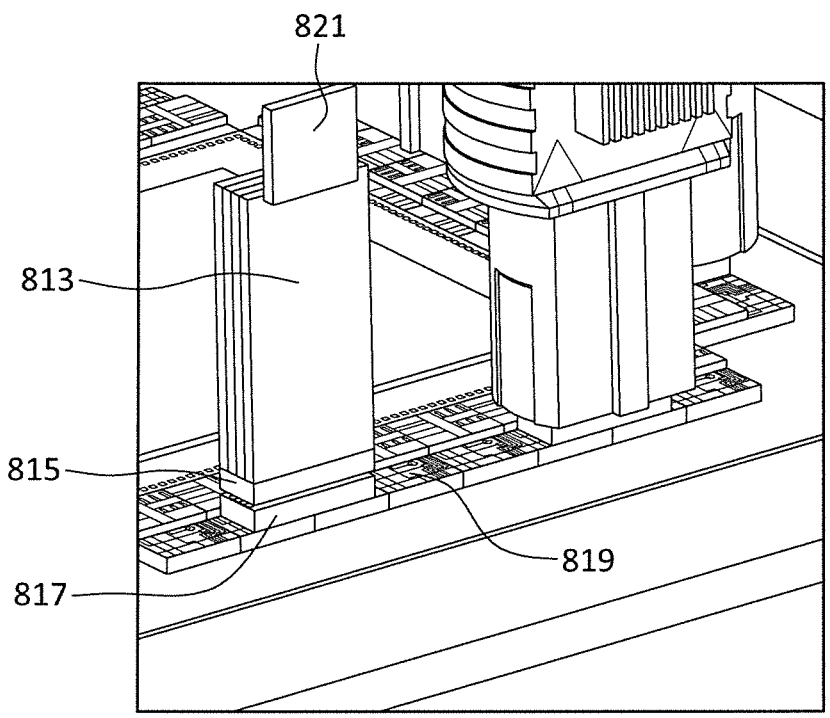
FIG. 8A illustrates a view of a connector side and an IC side of an interface for optical interconnection in accordance with aspects of the invention.

FIG. 8A shows a detailed view of a connector side and an IC side of an interface for optical interconnection in accordance with aspects of the invention. In FIG. 8A, the connector side includes a MEMS coupling device 821, for example as discussed in U.S. patent application Ser. No. 14/621,273 filed on Feb. 12, 2015 entitled PLANAR LIGHTWAVE CIRCUIT ACTIVE CONNECTOR, and/or U.S. Pat. No. 8,346,037 issued on Jan. 1, 2013 entitled MICROMECHANICAL ALIGNED OPTICAL ASSEMBLY, the disclosures of which are incorporated herein by reference for all purposes, a plurality of stacked PLCs 813, and a lens array 815. The MEMS coupling device couples lasers (not shown) to one of the plurality of stacked PLCs, with the plurality of stacked PLCs coupled to the lens array 815. In some embodiments, however, the MEMS coupling device and lasers are located elsewhere, for example near a front panel of a unit including the SiP IC. In some embodiments, the lens array 815 includes four rows of lens with sixteen lens per row for up to 64 total connections.

The IC side, similar to or same as the IC side shown in FIG. 7, includes a lens array 817 coupled to a SiP IC 819, with the SiP IC mounted on a breadboard or platform. In some embodiments, the lens array 817 is mounted directly on top of the SiP IC.

Figure 8B:
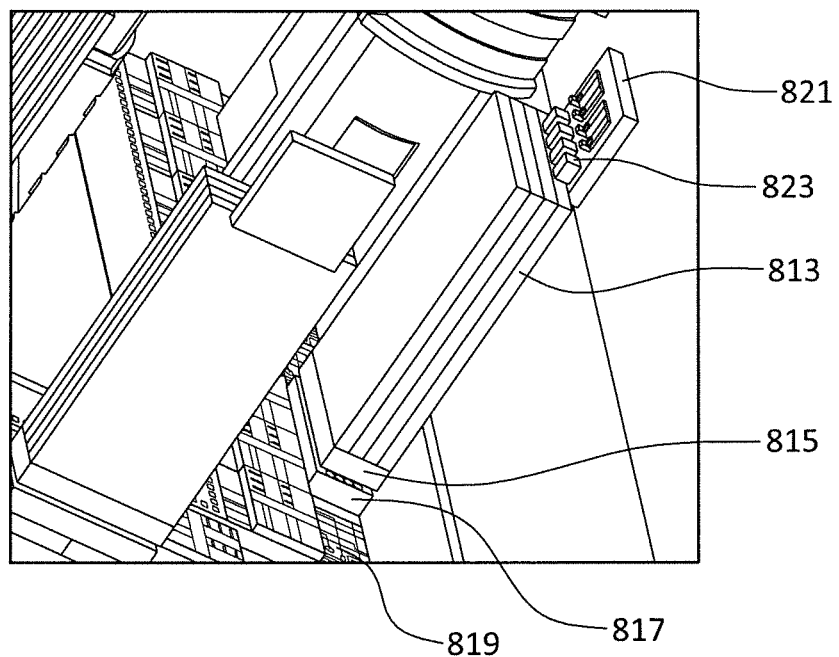
FIG. 8B illustrates an alternate view of a connector side and an IC side of an interface for optical interconnection in accordance with aspects of the invention.

FIG. 8B shows an alternate view of a connector side and an IC side of an interface for optical interconnection in accordance with aspects of the invention. In FIG. 8B, lasers 823 are coupled to the side of one of the plurality of stacked PLCs using the MEMS coupling device 821. Light from the lasers is passed to the SiP IC by way of the PLC, the lens array 815, and the lens array 817, with the SiP IC modulating the light from the lasers. The modulated light or optical signals then exit the SiP chip and enter another of the plurality of stacked PLCs, by way of the lens arrays 817 and 815, for multiplexing into a single output for transmission.

In various embodiments:
- The switch module yield and reliability are potentially higher, because the lasers are external to the switch.
- A failed laser assembly can be replaced independent of the switch ICs.
- Switch packaging may require that the components be able to survive solder reflow. With the PLC/LD assemblies external, those components may not have a designed requirement to endure such a process flow.
- The expanded beam connector does not require good physical contact in order to achieve high coupling efficiency; therefore, insertion force for the connection can be low. This may result in a switch assembly less prone to mechanical damage during cable attach or servicing.
- The lasers are somewhat removed from the switch IC, which generates a lot of heat. This allows for the possibility of lower-temperature operation of the lasers, enabling higher LD reliability and lower power operation. Increased heat sink capacity can be included with the cable assemblies.
- Interconnection from the top surface of the ICs can be advantageous compared to an edge-connection approach as the required data capacities increase, because interconnection can be made across the 2D top area of the IC rather than being limited to the perimeter. Cable exit from the top can also be an advantage for routing within the switch since less total space may be required for bringing the cables together in a bundle.

In an expanded-beam arrangement, mode-shaping is possible with the lenses, by using different focal length elements on each side of the connection or by using anamorphic elements. This may result in simpler PLC designs, since structures such as mode-shaping periodic segmented waveguides may not be included.

Although the invention has been discussed with respect to various embodiments, it should be recognized that the invention comprises the novel and non-obvious claims supported by this disclosure.

What is claimed is:

1. An optical connector for a silicon photonics chip, comprising:
   a housing having an end cavity;
   a plurality of lenses, arranged in a plurality of linear arrays forming a matrix, within the housing by the end cavity;
   a plurality of planar lightwave circuits (PLCs), positioned within the housing in parallel next to one another and mounted on top of the lenses, to pass light to or receive light from the lenses, wherein some of the plurality of PLCs include at least one optical multiplexer and others of the PLCs include at least one optical demultiplexer, and wherein the optical multiplexer and the optical demultiplexer include arrayed waveguide gratings (AWGs); and
   a plurality of optical fibers coupled to an opposing side of the PLCs, the opposing side being opposite a side of the PLCs mounted to the lenses.

2. The optical connector of claim 1, where the plurality of lenses provide part of an expanded beam connector.

3. The optical connector of claim 1, wherein the plurality of lenses are at a first opening of the housing.

4. The optical connector of claim 1, wherein the housing is part of a cable.

* * * * *